(12) United States Patent
Parks, II et al.

(10) Patent No.: US 11,052,535 B2
(45) Date of Patent: Jul. 6, 2021

(54) FLOOR-TO-HEIGHT OBJECT RETRIEVAL ROBOT

(71) Applicant: inVia Robotics, Inc., Westlake Village, CA (US)

(72) Inventors: Daniel Frank Parks, II, Los Angeles, CA (US); Randolph Charles Voorhies, Culver City, CA (US); Lior Elazary, Agoura Hills, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 131 days.

(21) Appl. No.: 16/260,791

(22) Filed: Jan. 29, 2019

(65) Prior Publication Data

US 2020/0238505 A1  Jul. 30, 2020

(51) Int. Cl.
*B25J 9/00* (2006.01)
*B25J 9/16* (2006.01)

(52) U.S. Cl.
CPC ........... *B25J 9/0027* (2013.01); *B25J 9/0021* (2013.01); *B25J 9/163* (2013.01); *B25J 9/1638* (2013.01)

(58) Field of Classification Search
CPC ...... B25J 9/0027; B25J 9/0045; B25J 9/0021; B25J 9/123; B25J 9/126; B25J 9/163; B25J 9/162; B25J 9/1623; B25J 9/1694; B25J 9/1697; B25J 9/1689; B25J 9/1687; B25J 9/1684; B25J 9/1638; G05B 19/41895; G05B 19/4189; B65G 1/0407; B65G 1/0435; B66F 11/04; B66F 11/042; B66F 11/044; B66F 11/046; B66F 11/048; B66F 9/0655; B66F 9/125; B66F 9/127; B66F 9/14; B66F 9/147; B66F 9/149; B66F 9/07554; B66F 9/07559; B66F 9/07; B66F 9/18–195

See application file for complete search history.

(56) References Cited

U.S. PATENT DOCUMENTS 3,497,095 A * 2/1970 Couberly ............ B66F 9/07554
                                           414/629
4,318,661 A * 3/1982 Helm ...................... B66F 9/187
                                           294/103.1

(Continued)

FOREIGN PATENT DOCUMENTS

DE        4010486 A1 * 12/1990 ............ B66F 9/061

OTHER PUBLICATIONS

EPO Translation of Description of DE 4010486 A, Koller, Dec. 6, 1990. (Year: 2020).*

*Primary Examiner* — Daniel D Yabut
(74) *Attorney, Agent, or Firm* — Ansari Katiraei LLP; Arman Katiraei; Sadiq Ansari

(57) ABSTRACT

Provided is a robot for retrieving objects with different sizes, shapes, weights, placements, configurations, and/or other characteristics from a floor or raised height. The robot may include a motorized base, a lift that raises to a plurality of heights from the base, an upper platform attached over the lift, a vertical extension extending downwards from a frontside of the upper platform and in front of the lift, a lower platform with a proximal end coupled to the vertical extension and a distal end extending in front of the robot and directly over a ground surface on which the motorized base moves when the lift is in a lowered position, and a retriever for retrieving an object onto the lower platform.

18 Claims, 14 Drawing Sheets

(56) References Cited

U.S. PATENT DOCUMENTS

| | | | | |
|---|---|---|---|---|
| 6,168,367 | B1* | 1/2001 | Robinson | B62B 3/1404 |
| | | | | 280/33.991 |
| 7,850,413 | B2* | 12/2010 | Fontana | B66F 3/44 |
| | | | | 414/331.14 |
| 2003/0059288 | A1* | 3/2003 | Robinson | B66F 9/18 |
| | | | | 414/539 |
| 2011/0238205 | A1* | 9/2011 | Kemp | B66F 9/07581 |
| | | | | 700/214 |
| 2012/0201639 | A1* | 8/2012 | Turrini | B60P 3/1091 |
| | | | | 414/634 |
| 2016/0304281 | A1* | 10/2016 | Elazary | B25J 15/06 |
| 2017/0225891 | A1* | 8/2017 | Elazary | B65G 1/1375 |
| 2017/0308070 | A1* | 10/2017 | Elazary | G05B 19/41865 |

\* cited by examiner

FLOOR-TO-HEIGHT OBJECT RETRIEVAL ROBOT

TECHNICAL FIELD

The present invention relates to the technical field of robotics.

BACKGROUND INFORMATION

Autonomous robots may be used to reduce costs in many industries and sectors by automating various manually performed tasks. Robots are especially effective at performing repeat mundane tasks.

Warehouse management and/or inventory management can greatly benefit from automation. Warehouse management and/or inventory management may include repeated tasks, such as receiving and storing inventory. Other repeated tasks may include order retrieval, fulfillment, and packaging. These are examples of some tasks that currently have high rates of manual or human execution. Automating one or more of these tasks may require special purpose robots that have the functionality to perform the tasks, and that are also programmed to perform the tasks.

DETAILED DESCRIPTION OF PREFERRED EMBODIMENTS

The following detailed description refers to the accompanying drawings. The same reference numbers in different drawings may identify the same or similar elements.

Disclosed are autonomous floor-to-height ("FTH") robots for retrieval and/or placement of objects on the ground or floor, as well as objects that are stored above the ground (e.g., objects stored to different levels of a storage rack, objects atop a platform or other raised surface, objects with raised legs, objects placed atop other objects, and/or other placements of objects off the floor). Moreover, the FTH robots may include structures that facilitate robotic retrieval and/or placement of objects that are on or above the ground, and that have different sizes, shapes, weights, placements, configurations, and/or other characteristics related to the objects or the storage of the objects in the warehouse.

Some prior art robots may require the configuration and infrastructure of a site to conform to the limitations of the prior art robots. For instance, some prior art robots may be unable to retrieve objects off the ground level, because they include specialized structures for retrieving objects from storage racks with above ground storage locations. However, the FTH robots, with their corresponding structures, form, and methods of operation, can conform to the configuration and infrastructure of most sites, and automate the retrieval and placement of different objects (e.g., sizes, shapes, weights, placements, configurations, and/or other characteristics) however they may be stored or located (e.g., on the floor or on different storage apparatus).

Figure 1:
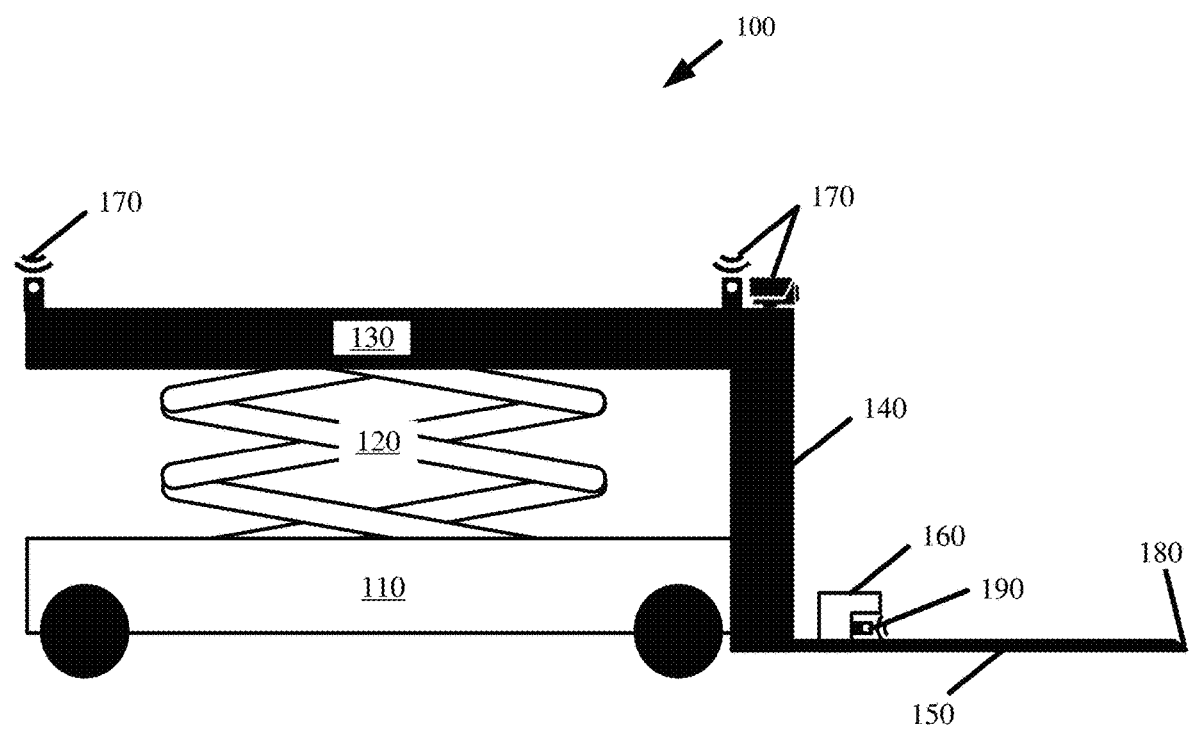
FIG. 1 illustrates an example of a floor-to-height ("FTH") robot in accordance with some embodiments described herein.
Figure 2:
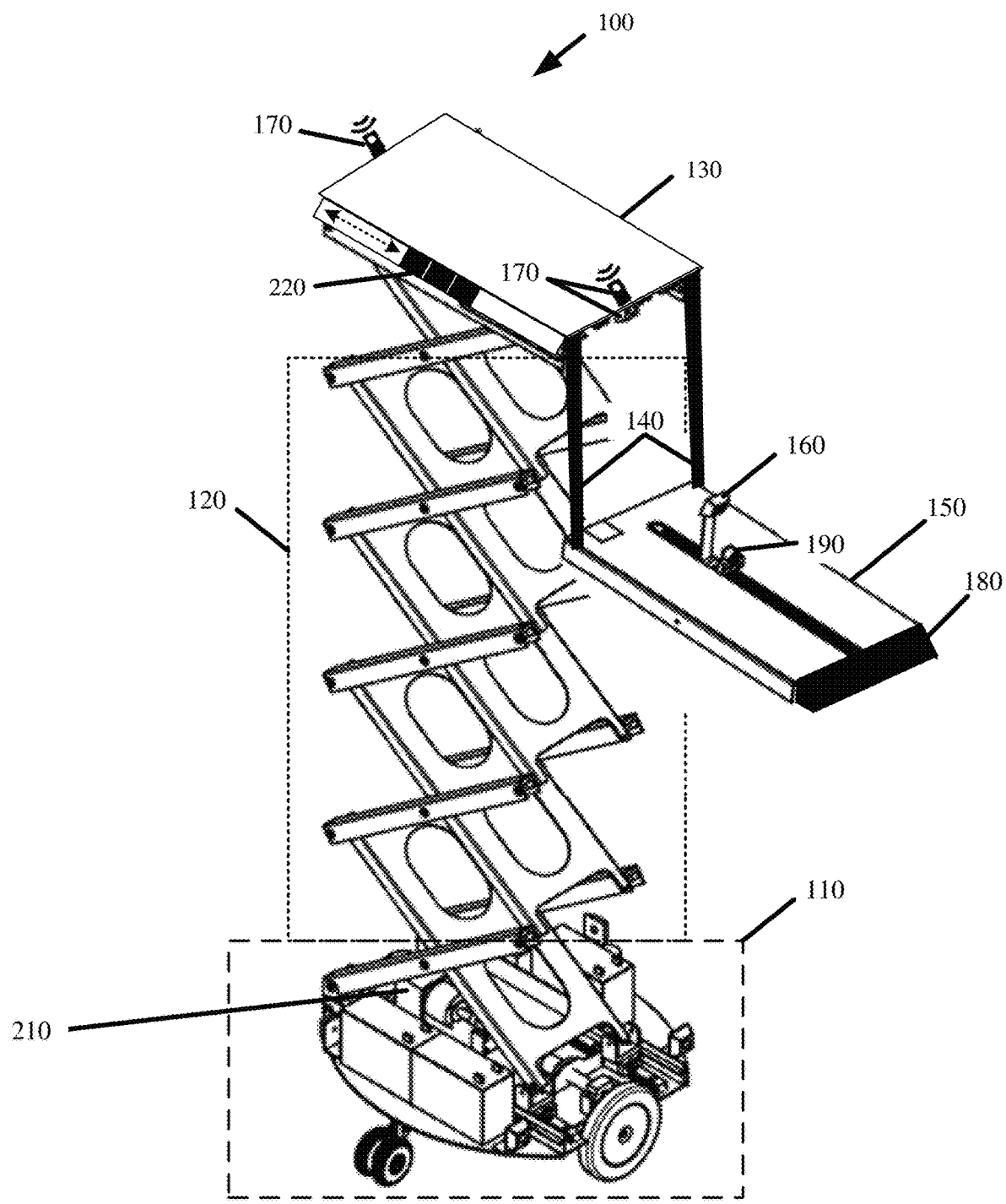
FIG. 2 provides a perspective view of the FTH robot in an expanded state in accordance with some embodiments.

FIG. 1 illustrates an example of FTH robot 100 in accordance with some embodiments described herein. FIG. 2 provides a perspective view of FTH robot 100 in an expanded state in accordance with some embodiments. FTH robot 100 may include motorized base 110, lift 120, upper platform 130, vertical extension 140, lower platform 150, and/or retriever 160.

Figure 3:
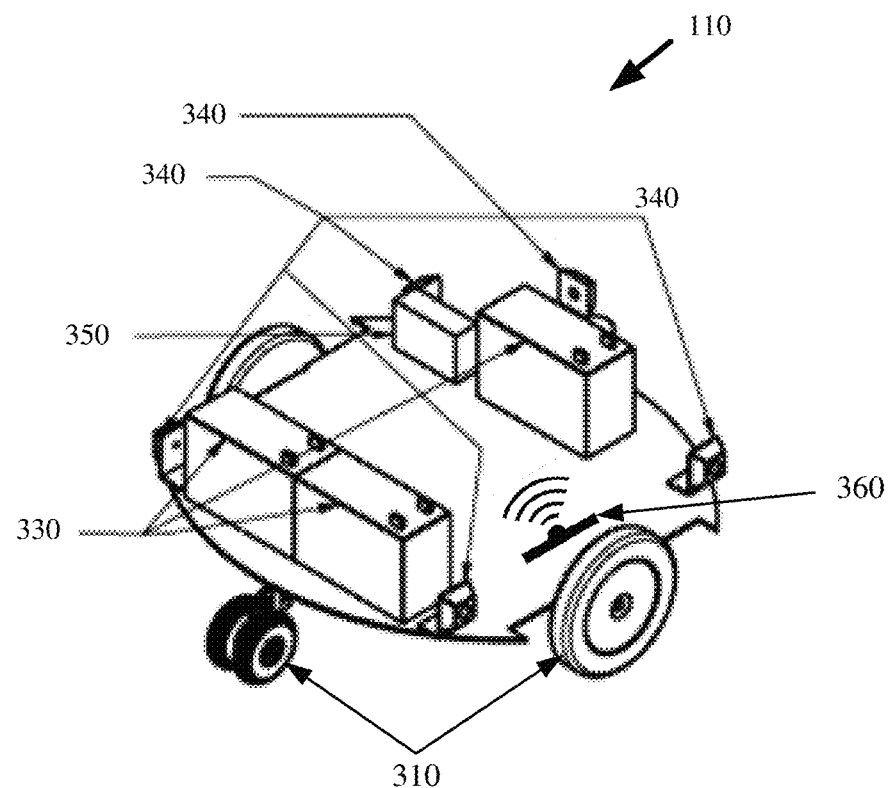
FIG. 3 illustrate top and bottom view for the motorized base of the FTH robot in accordance with some embodiments presented herein.
Figure 3:
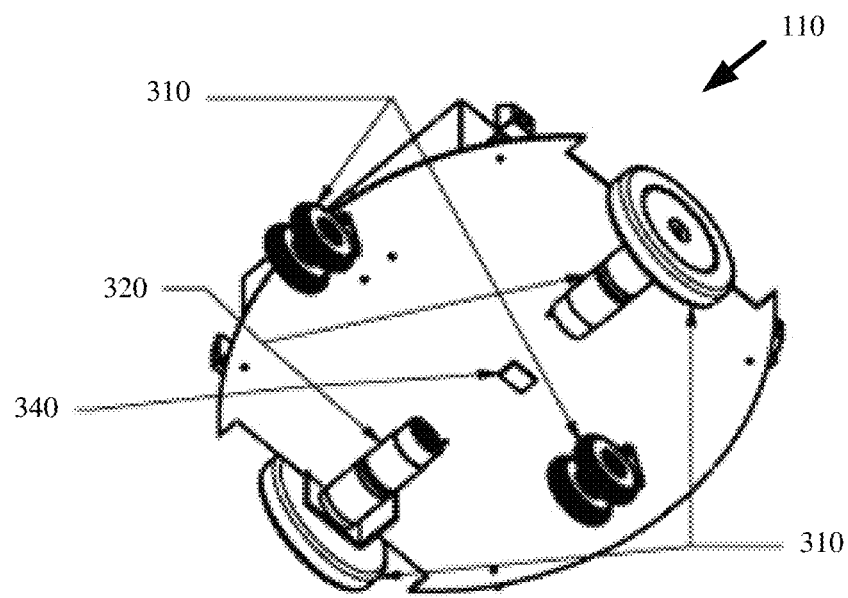

FIG. 3 illustrate top and bottom view for motorized base 110 of FTH robot 100 in accordance with some embodiments presented herein. Motorized base 110 may include wheels 310, one or more drive motors 320, and power supply 330. Power supply 330 may be a battery or other energy storage apparatus that supplies power to drive motors 320 and/or other electronic or powered components of FTH robot 100. Drive motors 320 power wheels 310, and move FTH robot 100.

In some embodiments, motorized base 110 may house additional components of FTH robot 100. For instance, motorized base 110 may include one or more sensors and actuators 340 that aid in navigation and obstacle avoidance. Sensors 340 may include cameras, accelerometers, speedometers, depth and/or three-dimensional sensors, light detection and ranging ("LiDAR"), radio detecting and ranging ("RADAR"), tilt sensor, inertial sensor, thermometer, and/or other devices that measures a physical property with which FTH robot 100 regulates speed, direction, turning, and/or other movements of motorized base 110.

Motorized base 110 may also house one or more processors 350 that control operations of FTH robot 100, including controlling movements of FTH robot 100 by regulating power that is provided to drive motors 320 and/or other sensors and actuators 340 of FTH robot 100. Processors 350 may collect sensory data from one or more sensors 340 in motorized base 110, elsewhere on FTH robot 100, and/or remote sensors (e.g., fixed beacons in a site) in order to control the movements of motorized base 110 and/or other sensors or actuators used in detecting, retrieving, and/or placing objects in a site. In some embodiments, motorized base 110 may include one or more radios 360 for wireless communications with other robots, a robot management system, and/or other network-enabled devices. FTH robot 100 may receive instructions for a new retrieval or placement task via radios 360, and may provide data regarding execution of assigned tasks to other devices via radios 360.

In some embodiments, motorized base 110 may include other means of locomotion besides or in addition to the aforementioned wheels. For instance, motorized base 110 may include tracks, two or more articulating legs, propellers, and/or other mechanical forms of locomotion.

Although not shown in FIG. 3, lift 120 is attached about centrally and atop motorized base 110. Lift 120 may be bolted on or otherwise affixed to motorized base 110. Lift 120 may be an extensible and/or collapsible structure that can raise to a plurality of different heights. In some embodiments, lift 120 may extend to a height of ten feet. In some other embodiments, lift 120 may be configured to reach greater heights if necessary.

Lift 120 may raise or lower to any of the plurality of different heights using one or more lift motors (e.g., motor 210 in FIG. 2) that are located on motorized base 110. In some embodiments, lift motors 210 may raise or lower lift 120 using a pneumatic force, piston, drive chain, rotating gear, screw-based mechanism, piston, and/or other structure. Lift 120 may include metal, plastic, and/or other rigid elements that are arranged in a collapsible manner, and that support raising and lowering lift 120 with heavy objects (e.g., objects weighing under one hundred pounds) exerted down force on lift 120.

As shown in FIGS. 1 and 2, lift 120 may be a scissor lift with an extensible, collapsible, and/or folding framework. In some other embodiments, lift 120 may be a vertical rail-based structure, spiral structure, or other extensible structure.

Fixed atop lift 120 may be upper platform 130. Accordingly, upper platform 130 may be raised and lowered with lift 120. Upper platform 130 may be a flat rigid surface.

In some embodiments, upper platform 130 may include stationary or movable counter-weight 220 (see FIG. 2) that FTH robot 100 may use to control its center of gravity and/or balance when retrieving and/or transferring objects on lower platform 150. In other words, counter-weight 220 may be placed on upper platform 130 to prevent FTH robot 100 from becoming front-heavy when retrieving and/or transferring heavy objects using lower platform 150. In some embodiments, moveable counter-weight 220 may include a set of weights that are attached to rails underneath upper platform 130. The set of weights may have a default position about a center of upper platform 130. Upper platform 130 may include a tilt sensor (e.g., sensors 170) to indicate when FTH robot 100 is becoming front-heavy, and may push one or more of the set of weights on the rails towards the backside of upper platform 130 using one or more actuators until balance and/or the center of gravity is restored. In some embodiments, counter-weight 220 may be statically located at the backside of upper platform 130 that is opposite to the frontside that is attached to lower platform 150 via vertical extension 140. In some embodiments, counter-weight 220 may be located on motorized base 110, and may be shifted across different sides or ends of motorized base 110 to rebalance FTH robot 100 when transporting heavy objects or no objects.

In some embodiments, upper platform 130 may include one or more sensors 170. Sensors 170 about upper platform 130 may be used to control a height of lift 120, and/or aid in navigation and collision avoidance. For instance, one or more sensors 170 (e.g., cameras) on upper platform 130 may ensure that lift 120 is not raised to a height that may contact a roof or other object suspended over FTH robot 100. Similarly, one or more sensors 170 on upper platform 130 may detect objects around FTH robot 100 that may be undetected by sensors 340 on motorized base 110.

Vertical extension 140 may be coupled to the frontside of upper platform 130, and may extend downward from upper platform 130. Vertical extension 140 may also be coupled to the backside of lower platform 150. Accordingly, vertical extension 140 may position lower platform 150 near the ground level when lift 120 is fully collapsed or lowered. In some embodiments, the length of vertical extension 140 may be about equal to the height of FTH robot 100 when lift 120 is fully collapsed or lowered.

Vertical extension 140 may be welded, bolted, or otherwise coupled to upper platform 130. As shown in FIG. 2, vertical extension 140 may include a pair of metal, plastic, or other rigid elements that extend down from the left and right sides of the upper platform 130 frontside. In some embodiments, vertical extension 140 may be a rectangular or solid element that spans the full width of upper platform 130 and/or lower platform 150.

Lower platform 150 may be a surface unto which retrieved objects may be placed for transfer by FTH robot 100. Lower platform 150 can be raised and lowered via operation of lift 120 by virtue of coupling lower platform 150 to vertical extension 140, and vertical extension 140 being coupled to upper platform 130 that is atop lift 120. As noted above, lower platform 150 may have a lowered position that is about equal to the ground, surface, and/or plane over which FTH robot 100 moves. Lower platform 150 may be moved to the lowered position in order to retrieve an object on the ground surface, place an object from lower platform 150 to the ground surface, and/or transport an object that is retrieved to lower platform 150 (in order to lower the center of gravity or height of FTH robot 100 during movement). In some embodiments, the distal end of lower platform 150 (e.g., end opposite to the end coupled to vertical extension 140) may include ramp 180 to aid in transitioning an object off the floor and onto lower platform 150. Lower platform 150 may be raised to higher positions in order to retrieve an object from, or place an object to, a storage location that is off the ground surface.

Lower platform 150 may include retriever 160. Retriever 160 may be an actuator for engaging objects of different sizes, shapes, weights, and/or other physical properties. In some embodiments, retriever 160 may move between the front and back of lower platform 150 via a drive motor or other actuator. For instance, the base of retriever 160 may be disposed within a rail or over a screw-based mechanism that allows an actuator to move retriever 160 between the front and back (e.g., proximal and distal ends) of lower platform 150.

In some embodiments, retriever 160 may contain a vacuum and or suction cup to engage objects with suction. In some such embodiments, retriever 160 may include two or more vacuums or suction elements that are vertically or horizontally aligned. Retriever 160 may activate all suction elements when engaging, retrieving, and/or placing larger and/or heavier objects. The additional suction elements create additional force for engaging the object, and also provide additional points of contact when engaging larger objects. Retriever 160 may activate fewer suction elements when engaging, retrieving, and/or placing smaller and/or lighter objects, especially when less suction is needed to engage the object or the object is aligned with just one suction element because of its smaller size.

In some other embodiments, retriever 160 may include a magnet or electromagnet that generates a magnetic force to engage an object. Retriever 160 may also generate and/or use other forces to engage an object. For instance, retriever 160 may include a mechanical claw or gripper that can be used to grab objects as further shown below with reference to FIG. 10. Once an object is engaged with retriever 160, the actuator, that controls the positioning of retriever 160, may be activated to pull the engaged object onto lower platform 150 or push the engaged object off of lower platform 150.

Retriever 160 may include a pivoting head so as to be able to make flush contact with and engage objects of different sizes and shapes. The pivoting head may also allow retriever 160 to retain engagement when retrieving or placing an object and the object slightly shifts or otherwise moves during retrieval or placement.

Retriever 160 and/or lower platform 150 may include one or more sensors 190 (e.g., a pressure sensor, camera, etc.) to determine when retriever 160 makes contact with an object, when retriever 160 engages an object, and/or verify that an engaged object is moved onto or off lower platform 150. Sensor(s) 190 may also be used in conjunction with lift 120 and one or more processors of FTH robot 100 to align a height of lower platform 150 with a bottom of an object that is being retrieved. By aligning the height of lower platform 150 with the bottom of the object being retrieved, retriever 160 may simply pull the object onto lower platform 150 so that lower platform 150 can support the object's weight rather than rely on retriever 160 to lift and/or otherwise support the weight of the object during retrieval. As a result of retriever 160 not having to lift the object that is being retrieved or otherwise support the object's weight during retrieval, retriever 160 is able to retrieve and place heavy objects.

In some embodiments, sensor 190 may include a set of load sensors that are distributed under lower platform 150. The set of load sensors may measure the weight of one or more objects placed atop lower platform 150.

In some embodiments, sensor 190 may include a scanner to scan a fiducial, marker, or other identifier of an object that is being retrieved or placed to a storage location as well as a fiducial, marker, or other identifier of the storage location. The scans can be used to confirm that FTH robot 100 is retrieving a correct object, and/or is at a correct storage location. The scans can also be used to notify an inventory tracking system that FTH robot 100 has retrieved an object from a particular storage location or has placed an object at a particular storage location so that the inventory tracking system can update the location of the object for future reference.

Figure 4:
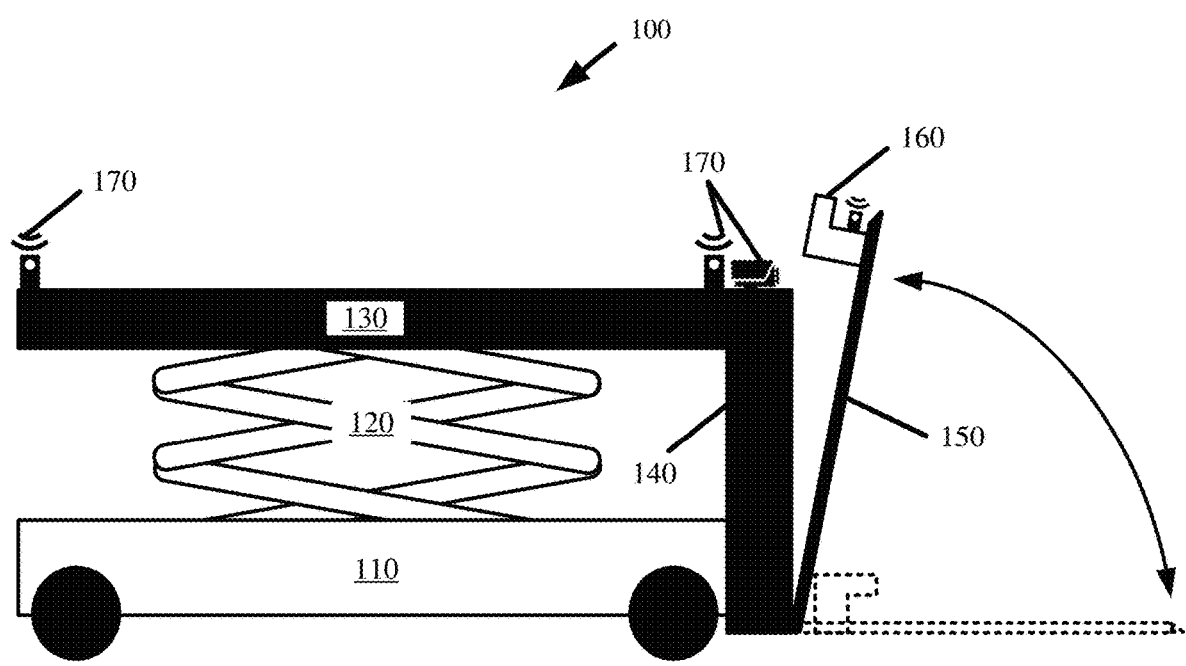
FIG. 4 illustrates an example of rotating the lower platform about a proximal end in accordance with some embodiments presented herein.

In some embodiments, a rotating actuator may be located at the intersection of vertical extension 140 and lower platform 150. The rotating actuator may lift the distal end of lower platform 150 towards vertical extension 140 when lower platform 150 is not in use or when the FTH robot 100 is moving without carrying an object. FIG. 4 illustrates an example of rotating lower platform 150 about a proximal end so that the distal end is lifted towards vertical extension 140 in accordance with some embodiments presented herein.

FTH robot 100 may rotate lower platform 150 towards vertical extension 140 to reduce the overall size footprint of FTH robot 100, and allow FTH robot 100 to move in tighter spaces with less potential for collision. FTH robot 100 may rotate lower platform 150 to be perpendicular to vertical extension 140 when retrieving an object onto lower platform 150 or transferring an object that has already been retrieved onto lower platform 150.

Figure 5A:
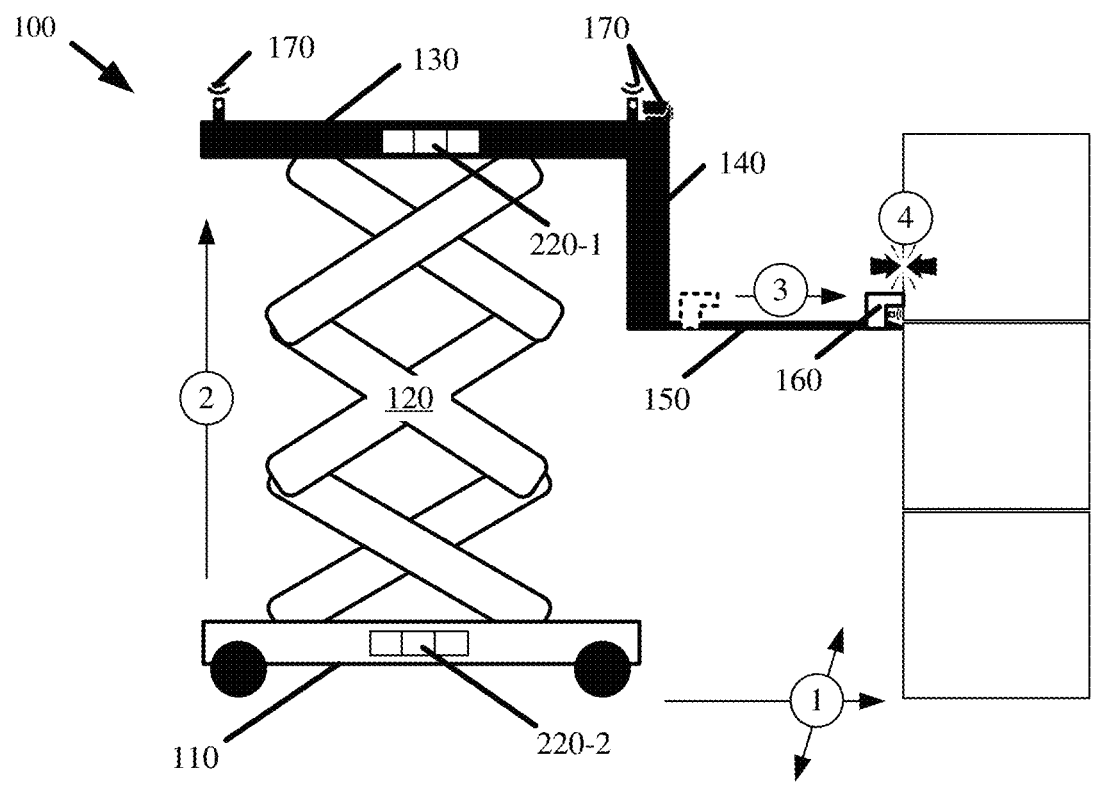
FIGS. 5A and 5B illustrate an example of the FTH robot retrieving an object that is located at a height above the floor in accordance with some embodiments.
Figure 5B:
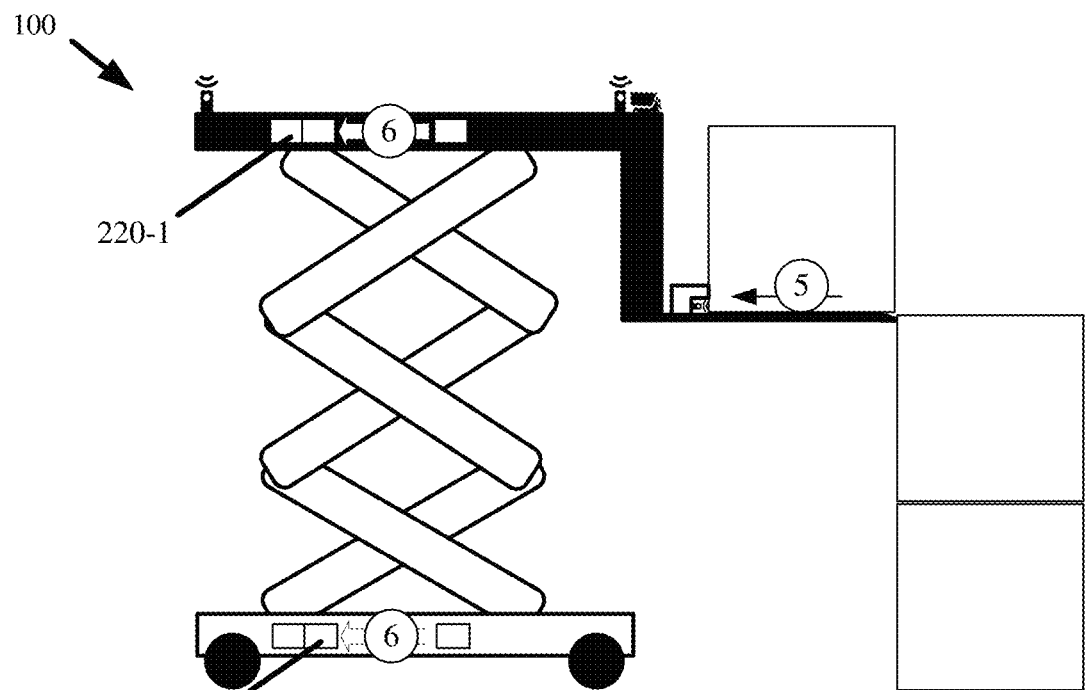

FIGS. 5A and 5B illustrate an example of FTH robot 100 retrieving an object that is located at a height above the floor in accordance with some embodiments. In FIG. 5A, FTH robot 100 navigates (at 1) to a vertical stack of objects where the topmost object in the stack is an object that FTH robot 100 is tasked with retrieving. FTH robot 100 may orient (at 1) itself before the vertical stack of objects. For instance, FTH robot 100 may use cameras and other sensors to detect the vertical stack of objects, center lower platform 150 relative to the detected objects, and move lower platform 150 in front of the objects without contacting the objects.

FTH robot 100 may raise (at 2) lift 120 until a height of lower platform 150 is aligned with a bottom of the topmost object in the vertical stack that is to be retrieved. For the height alignment, FTH robot 100 may use one or more sensors 190 that are located on lower platform 150 and/or one or more sensors 170 that are located on upper platform 130 in order to identify the topmost object, the bottom of the topmost object, and align a height of the lower platform 150 with the bottom of the topmost object. In some embodiments, FTH robot 100 may use sensory input in conjunction with identifier matching, feature matching, shape detection, and/or other image processing to detect the bottom of the topmost object. For instance, sensor 190 may detect a bottom of an object by detecting the object lower boundary and/or a gap between two objects. Similarly, sensors 170 and/or 190 may detect the desired object by scanning an identifier on or near the object that identifies the object, or by identifying one or more visual features of the object. In some embodiments, FTH robot 100 may align the height based on a height parameter that FTH robot 100 receives from a robot management system. The robot management system may track the exact position of each object, and may relay the positioning information of a particular object to FTH robot 100 when directing FTH robot 100 to retrieve that particular object.

Once FTH robot 100 is properly aligned, retriever 160 on lower platform 150 may be activated. In particular, retriever 160 may move towards (at 3) the topmost object until contact is made, retriever 160 may then engage (at 4) the topmost object using suction and/or other forces.

As shown in FIG. 5B, FTH robot 100 may retrieve the topmost object by moving (at 5) retriever 160, after engaging (at 4) the topmost object, to the back of lower platform 150. While engaged, retriever 160 pulls the topmost object off of the stack or away from its storage location and onto lower platform 150. While retrieving the object onto lower platform 150, FTH robot 100 may adjust (at 6) a position of one or more counter-weights 220-1 on upper platform 130 or counter-weights 220-2 on motorized base 110 to better balance FTH robot 100 and/or its center of gravity. After retrieving object onto lower platform 150, FTH robot 100 may lower lift 120 and transfer the object to a destination location.

Figure 6A:
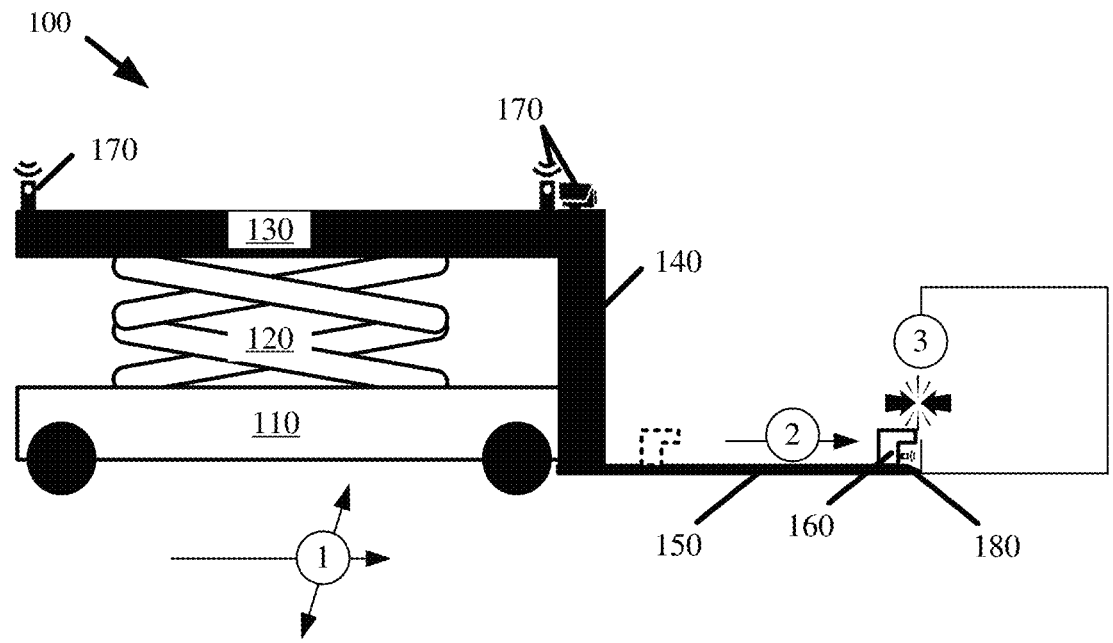
FIGS. 6A and 6B illustrate an example of the FTH robot retrieving an object on the floor using the same robotic structures and elements as used in retrieving an object that is located off the ground in accordance with some embodiments.
Figure 6B:
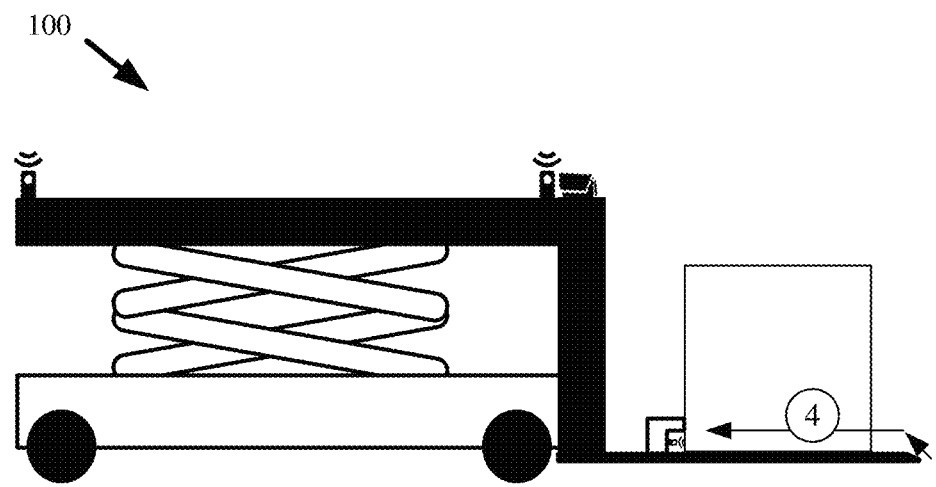

FIGS. 6A and 6B illustrate an example of FTH robot 100 retrieving an object on the floor using the same robotic structures and elements as used in retrieving an object that is located off the ground in accordance with some embodiments. In FIG. 6A, FTH robot 100 navigates (at 1) to the desired object that is on the floor. FTH robot 100 may also orient (at 1) itself before the object, and ensure that lift 120 is at a lowered position.

Retriever 160 on lower platform 150 may be activated. In particular, retriever 160 may move (at 2) towards the object until contact is made, retriever 160 may then engage (at 3) the object using suction and/or other forces.

As shown in FIG. 6B, FTH robot 100 may retract retriever 160 that is now engaged to the object. In doing so, retriever 160 may pull the object onto lower platform 150. In particular, the object may contact and go up ramp 180 at the distal end of lower platform 150 before sliding over lower platform 150. In some embodiments, retriever 160 may have a pivoting head to accommodate slight movement of the object during retrieval without losing engagement with the object.

In some embodiments, FTH robot 100 may be configured with different retrievers 160 and/or may have different placements for retriever 160. In some such embodiments, the different retrievers 160 and/or different retriever placements are selected to ensure that FTH robot 100 retains functionality and operation, including the ability to retrieve objects of different sizes, shapes, weights, and/or other physical properties from the ground and at different heights, and to similarly place objects on the ground or in storage locations at different heights.

Figure 7A:
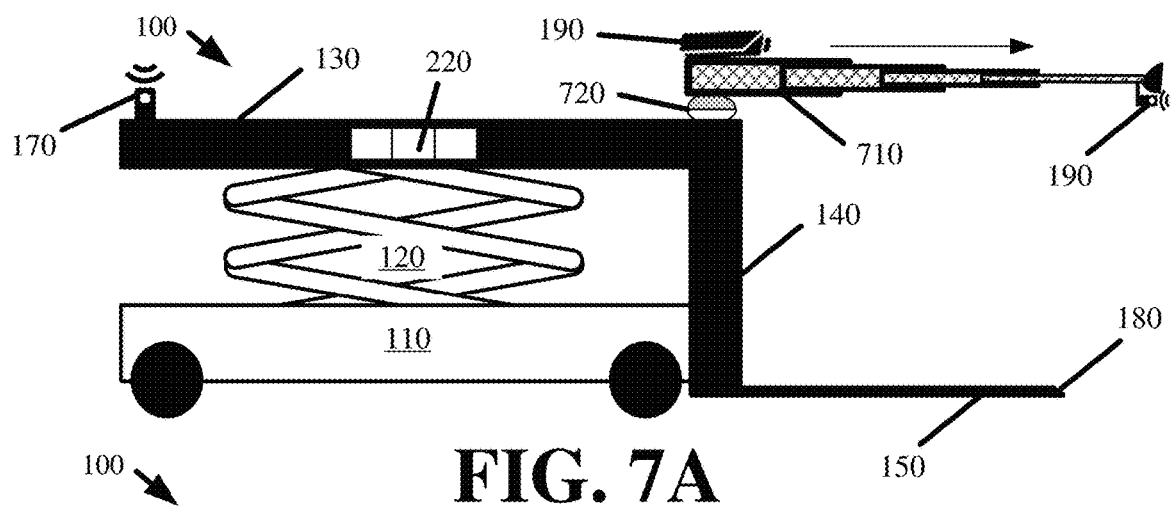
FIGS. 7A, 7B, and 7C illustrate examples of the FTH robot with a telescoping retriever and different telescoping retriever placements in accordance with some embodiments presented herein.

FIGS. 7A. 7B. and 7C illustrate examples of FTH robot 100 with different retriever 710 placements in accordance with some embodiments presented herein. FIG. 7A illustrates FTH robot 100 with retriever 710 disposed atop and about a frontside of upper platform 130 near where upper platform 130 is coupled to vertical extension 140.

In FIG. 7A, retriever 710 may be an extensible and collapsible or telescoping arm with an engagement element at the distal end. An actuator may be housed at the proximal end of retriever 710, and may control the extension and collapsing action of the telescoping arm. The telescoping arm may collapse the distal end with the engagement element back towards the edge of upper platform 130, and may extend the distal end with the engagement element to or beyond the distal end of lower platform 150. The extension beyond the distal end or length of lower platform 150 allows retriever 710 to engage an object before the object makes contact with lower platform 150. In some embodiments, retriever 710 may extend several feet beyond the distal end of lower platform 150. The extension allows retriever 710 to engage objects that may be away from the storage location edge. For instance, objects may be arranged behind one another on a shelf, and one or more frontmost objects may have been removed. In this case, retriever 710 can extend deep into the storage location, engage the next frontmost object that is recessed within the shelf, pull the engaged object over the shelf towards the edge of the shelving and onto lower platform 150.

The distal end may include a pivot point that allows the engagement element to rotate about the distal end in order to engage objects of different sizes and shapes from different angles. The engagement element may be a vacuum and/or suction cup that engages an object with suction. The engagement element may be a magnet, gripper (e.g., mechanical claw), or other device that uses one or more different forces to engage an object.

In some embodiments, retriever 710 may include pivoting base 720 that connects retriever 710 to upper platform 130. Pivoting base 720 may include an actuator for rotating retriever 710 vertically and/or horizontally in order to better align the engagement element with an object.

Retriever 710 may include one or more sensors 190. For example, retriever 710 may include a pressure sensor to determine when the engagement element makes contact with an object that is to be retrieved. As another example, retriever 710 may include a camera or range finder to align the engagement element with the object being retrieved. FIG. 7A illustrates sensor 190 (e.g., a camera) at a proximal end of retriever 710. However, one or more sensors 190 can be located at either the proximal end or distal end of retriever 710. For instance, a camera and/or a pressure sensor may be located near or adjacent to the engagement element, and may extend outwards with the engagement element.

Figure 7B:
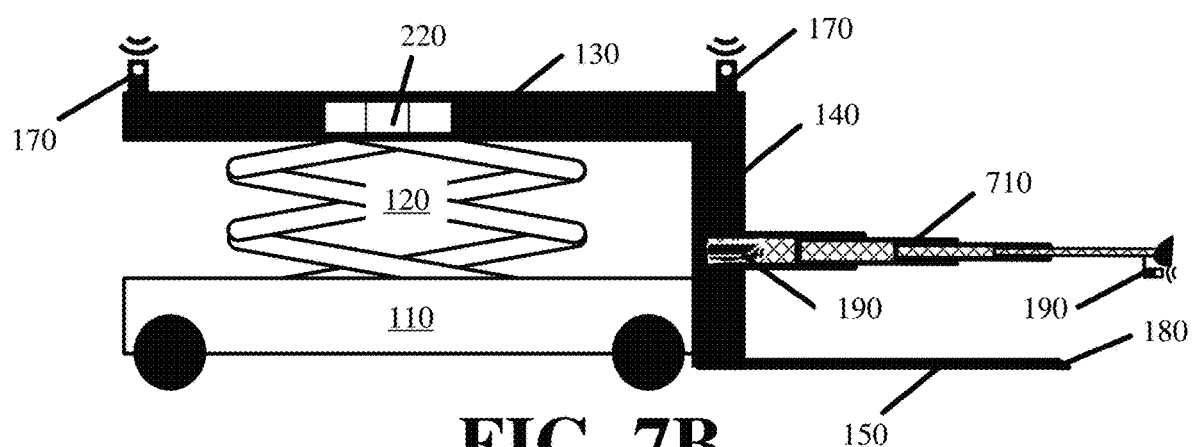

FIG. 7B illustrates an alternate placement for retriever 710 on FTH robot 100 in accordance with some embodiments presented herein. In FIG. 7B, retriever 710 is located about one or both sides of vertical extensions 140. Two retrievers 710 may be located about either side of vertical extensions 140 to increase the engagement and/or retrieval force that can be created by FTH robot 100, and to perform a straight retrieval of an object.

The placement of retriever 710 about vertical extensions 140 aligns the height of retriever 710 with the height of most objects that can be retrieved by FTH robot 100. In some embodiments, the height of retriever 710 about one or more sides of vertical extensions 140 may be adjustable. For instance, retriever 710 may be coupled to a rail that runs the height of vertical extensions 140. A drive motor may be coupled to a base of retriever 710, and may move retriever 710 up and down across the vertical rail. As noted above with reference to FIG. 7A, retriever 710 may include a rotating or pivoting base with an actuator for adjusting positioning of retriever 1610. The vertical height of retriever 710 may be adjusted to engage objects of different sizes and shapes about their center.

Figure 7C:
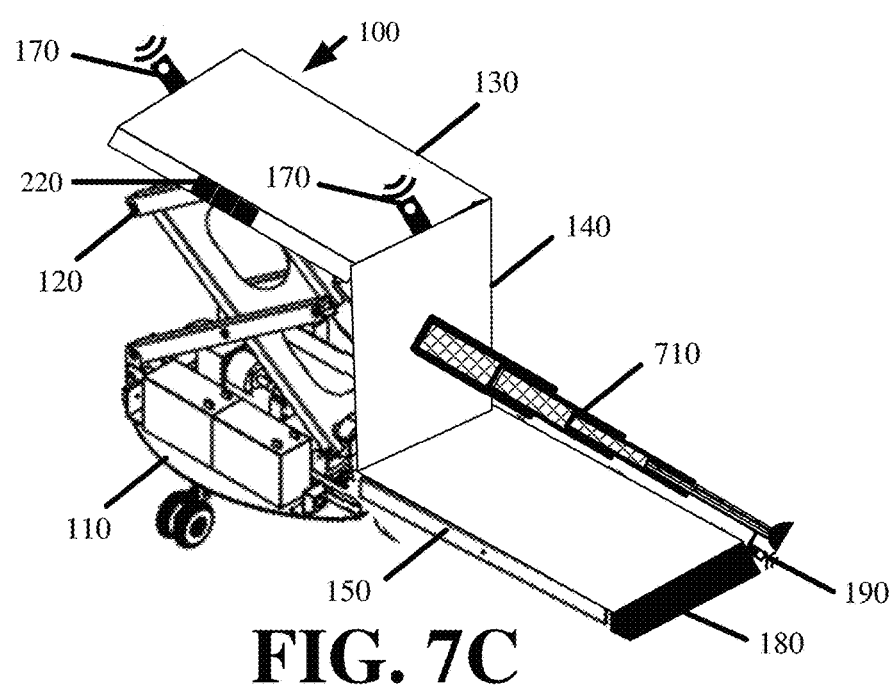

FIG. 7C illustrates still another different placement for retriever 710 on FTH robot 100 in accordance with some embodiments presented herein. In FIG. 7C, vertical extension 140 is a rectangular solid surface that extends the full width of upper platform 130 and lower platform 150. In FIG. 7C, retriever 710 is located about a center of vertical extension 150. Retriever 710 may be a telescoping arm with an engagement element at the distal end that collapses into vertical extension 140, and that extends past the distal end of lower platform 150.

Figure 8A:
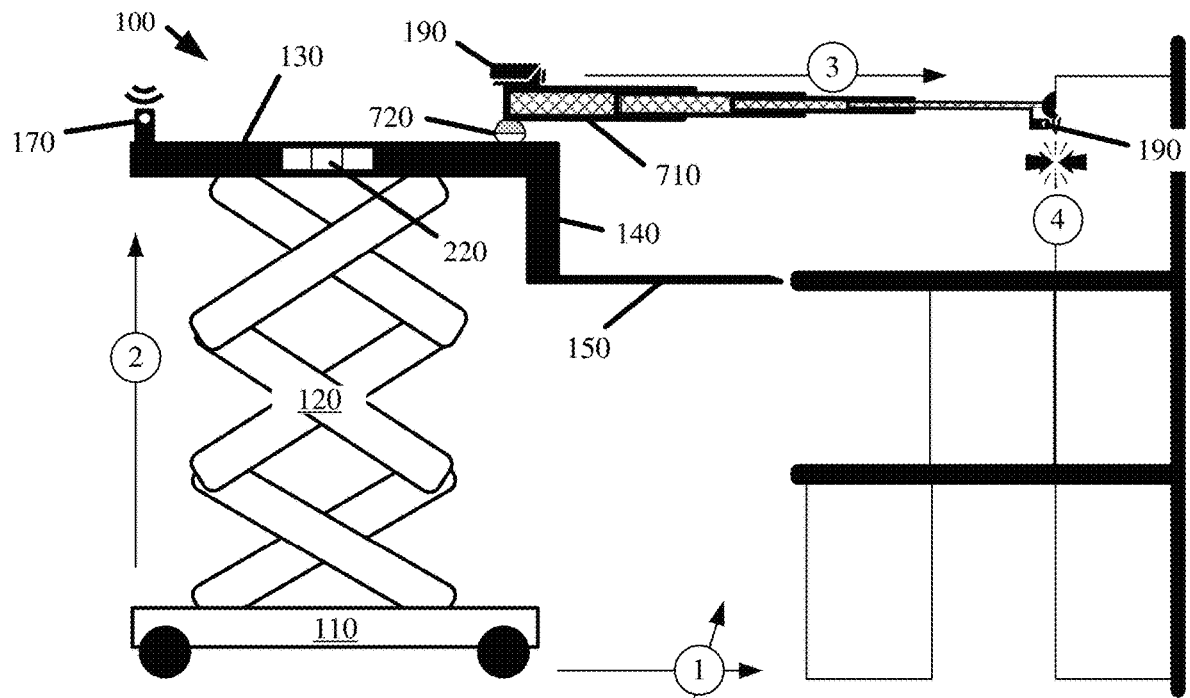
FIGS. 8A and 8B illustrate an example of the FTH robot retrieving an object that is located at some height off the ground using the telescoping retriever in accordance with some embodiments.
Figure 8B:
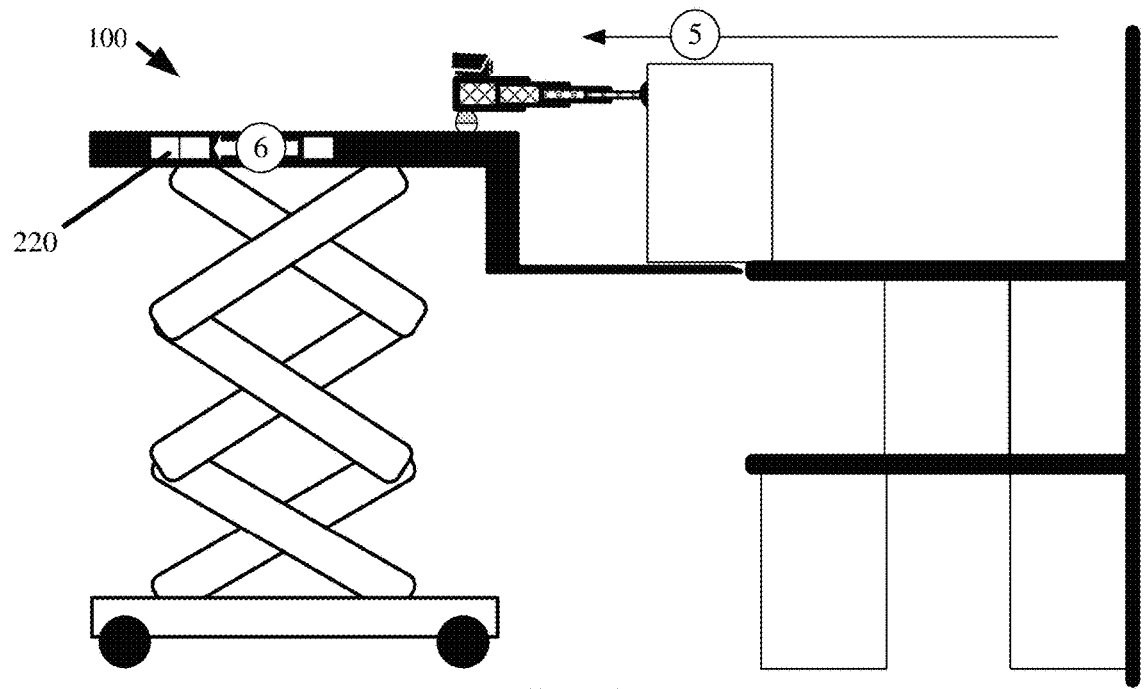

FIGS. 8A and 8B illustrate an example of FTH robot 100 retrieving an object that is located at some height off the ground using retriever 710 in accordance with some embodiments. In FIGS. 8A and 8B, retriever 710 is positioned on upper platform 130. In some other embodiments, retriever 710 may have the positioning illustrated in FIGS. 7B and 7C, while still performing the same operations that are described below with reference to FIGS. 8A and 8B.

In FIG. 8A, FTH robot 100 navigates (at 1) to the location of the desired object, and may reposition (at 1) itself before the storage location of the object. For instance, FTH robot 100 may change positioning, using one or more sensors 340 and movements of motorized base 110, in order to align lower platform 150 with a front of the storage location.

FTH robot 100 may activate (at 2) lift 120, and use one or more sensors on upper platform 130, vertical extension 140, and/or lower platform 150 (e.g., sensors 170 and 190) to identify the desired object at the raised storage location, and to align lower platform 150 with the bottom of the desired object. For instance, the one or more sensors may scan identifiers identifying each object or each storage location until the desired storage location with the desired object is located. Alternatively, the one or more sensors may scan the objects, and may use feature matching to identify the desired location.

Retriever 710 on lower platform 150 may then be activated. In particular, retriever 710 may extend (at 3) towards the desired object until contact is made. Retriever 710 may engage (at 4) the object using suction and/or other forces.

FIG. 8B illustrates FTH robot 100 retracting (at 5) retriever 710 with the desired object engaged. Consequently, retriever 710 slides the desired object from its storage location onto lower platform 150. As noted above, FTH robot 100 may shift (at 6) one or more counter-weights 220 on upper platform 130 to adjust the center of gravity in response to deviations that may occur due to the weight of the retrieved object on lower platform 150.

FTH robot 100 may use one or more sensors to determine when the object is entirely on lower platform 150, and no longer partially supported by a rack, shelf, or other object. Once the object is entirely on lower platform 150, FTH robot 100 may lower lift 120, and move to transfer the retrieved object to a destination.

Figure 9A:
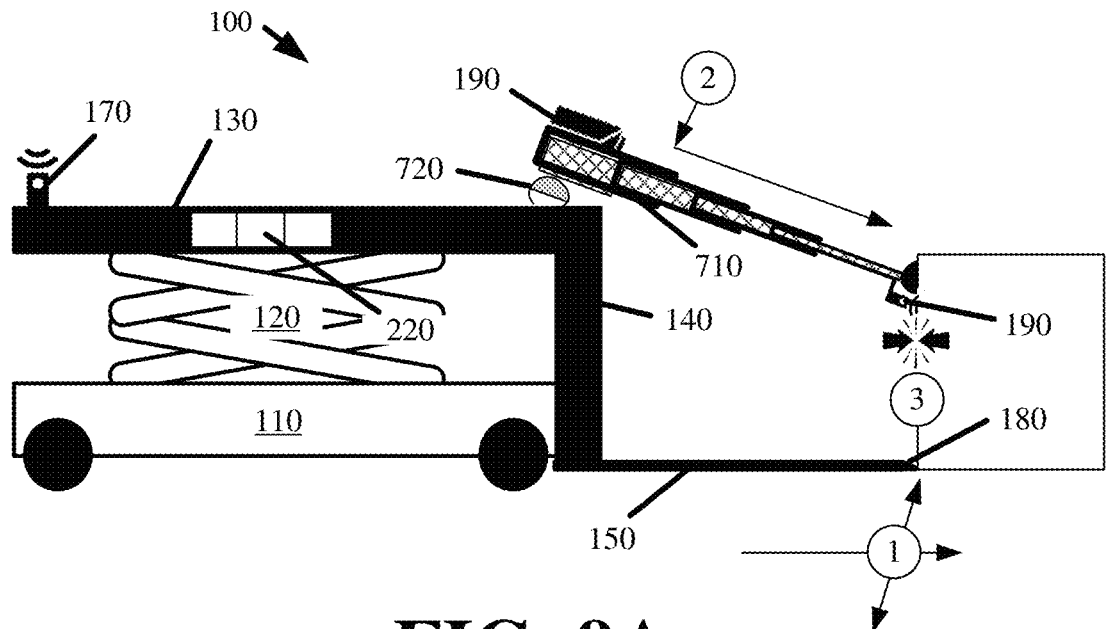
FIGS. 9A and 9B illustrate an example of the FTH robot retrieving an object that is located on the ground using the telescoping retriever in accordance with some embodiments.
Figure 9B:
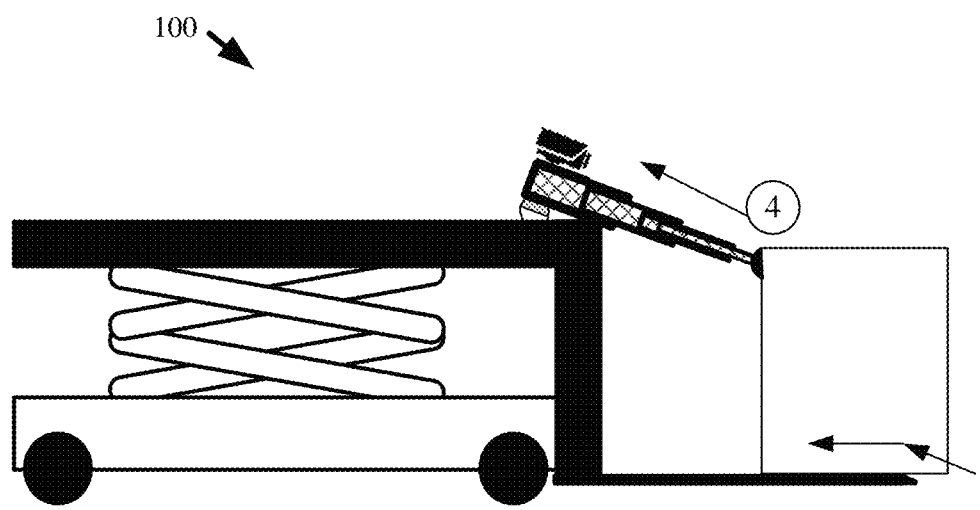

FIGS. 9A and 9B illustrate an example of FTH robot 100 retrieving an object that is located on the ground using retriever 710 in accordance with some embodiments. In FIG. 9A, FTH robot 100 navigates (at 1) to the desired object that is on the ground, and orients (at 1) its positioning relative to the positioning of the object. FTH robot 100 may also ensure that lift 120 is at a lowered position.

Retriever 710 on lower platform 150 may be activated. In particular, retriever 710 may extend (at 2) towards the object until contact is made. As shown in FIG. 9A, retriever 710 may tilt or rotate downward at base 720 in order to accommodate and engage objects of different heights. When retriever 710 is positioned about the sides of vertical extensions 140 (e.g., as shown in FIG. 7B, or centrally about a surface of vertical extension 140 (e.g., as shown in FIG. 7C), retriever 710 may require fewer positional adjustments to engage objects of different shapes and/or sizes.

Retriever 710 may engage (at 3) the object using suction and/or other forces. Then, as shown in FIG. 9B, FTH robot 100 may retract (at 4) retriever 710 that is now engaged to the object. In doing so, retriever 710 may pull the object onto lower platform 150. In particular, the object may contact and go up the ramp at the distal end of lower platform 150 before sliding onto lower platform 150.

Figure 10:
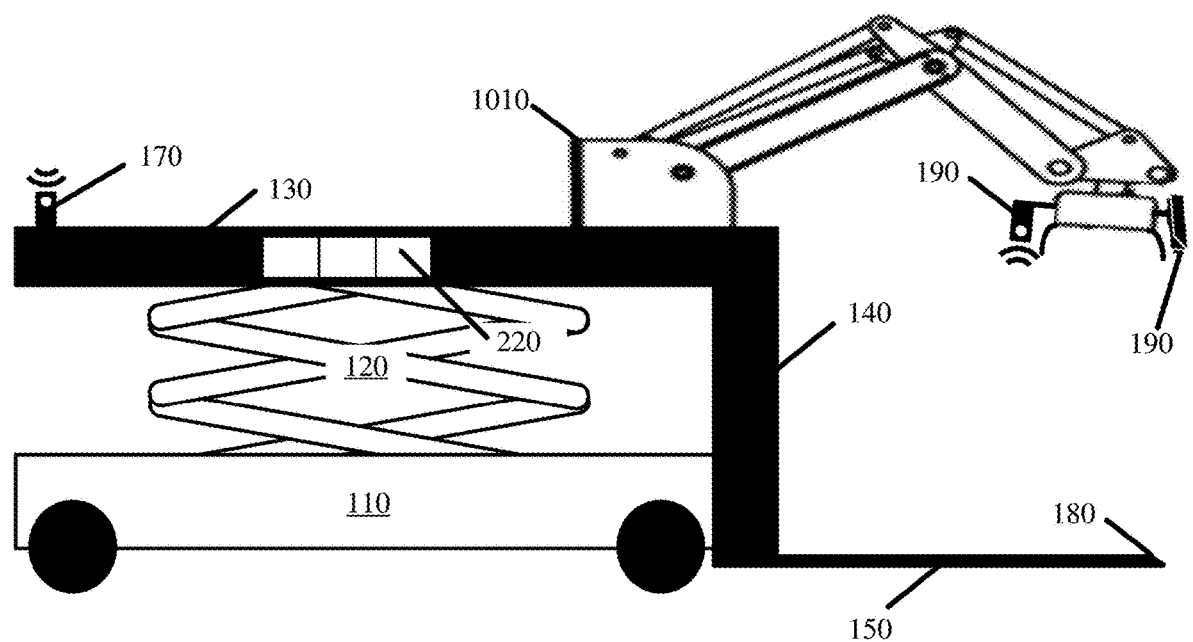
FIG. 10 illustrates an example of the FTH robot with an articulating arm retriever in accordance with some embodiments presented herein.

FIG. 10 illustrates an example of FTH robot 100 with articulating arm retriever 1010 in accordance with some embodiments presented herein. Articulating arm retriever 1010, like telescoping arm 710 illustrated by FIGS. 7A-7C, and movable retriever 160 illustrated by FIGS. 1-2, allows FTH robot 100 to engage objects of different sizes, shapes, weights, and/or other physical properties that may be located on the ground or off the ground at different heights.

As shown in FIG. 10, articulating arm retriever 1010 may positioned about the frontside of upper platform 130. Articulating arm retriever 1010 may move in three-dimensions, and extend beyond the length of lower platform 150. Articulating arm retriever 1010 may also include one or more sensors 190 at its base or the distal end of retriever 1010 to aid in the detection and engagement of objects. In some embodiments, articulating arm retriever 1010 may include a set of pincers to grab (e.g., engage) objects from a side or top in order to move the objects onto lower platform 150. In some embodiments, articulating arm retriever 1010 may include a vacuum, magnet, and/or other engaging element at the distal end to engage objects with suction, magnetic force, and/or other forces.

Space constraints in a site or in aisles or paths may make movements of FTH robot 100 difficult. For instance, in the embodiments above, FTH robot 100 is illustrated with low platform 150 extending in front of FTH robot 100. Lower platform 150, in the front position, extends the overall length of FTH robot 100, thereby increasing radius needed by FTH robot 100 to perform turns. Some embodiments may alter the positioning of the FTH robot structures to allow for greater maneuverability in narrower aisle, paths, and/or sites while still preserving the robot's ability to retrieve objects that are on the ground or floor level as well as objects that are stored at different heights above the ground or floor level.

Figure 11:
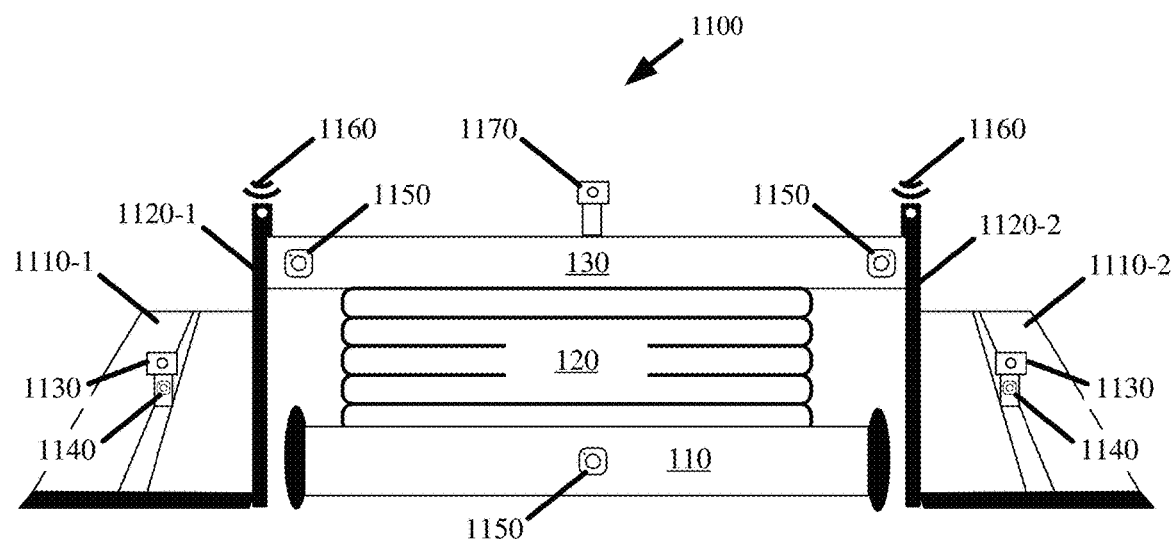
FIG. 11 illustrates a modified FTH robot in accordance with some embodiments described herein.

FIG. 11 illustrates modified FTH robot 1100 in accordance with some embodiments described herein. As with FTH robot 100, FTH robot 1100 may include motorized base 110, lift 120, upper platform 130. However, unlike FTH robot 100, FTH robot 1100 may include side platforms 1110-1 and 1110-2 (herein sometimes collectively referred to as "side platforms 1110" or individually as "side platform 1110"), instead of or in addition to a platform extending out from a front of the robot (e.g., lower platform 150). Various sensors and actuators may be located on one or more of these structures. In some embodiments, FTH robot 1100 may include additional or fewer structures, and/or a repositioning of the structures.

As shown in FIG. 11, vertical extensions 1120-1 and 1120-2 extend downwards from left and right sides of upper platform 130 and FTH robot 1100. Attached to the bottom of vertical extension 1120-1, and extending outwards and away from a left side of FTH robot 1100 is side platform 1110-1. Similarly, attach to the bottom of vertical extension 1120-2, and extending outwards and away from a right side of FTH robot 1100 is side platform 1110-2. The two side platforms 1110 allow FTH robot 1100 to retrieve, carry, and transfer more objects at any given time than when configured with only a single platform. It should be noted that FTH robot 100 illustrated above can be modified to include one lower platform 150 at the front of FTH robot 100 and extending in front of FTH robot 100, and another lower platform 150 at the back of FTH robot 100 and extending behind FTH robot 100.

Each side platform 1110 may include a flat surface onto which one or more objects may be retrieved. The flat surface may support the retrieved objects during transport.

Each side platform 1110 may further include retriever 1130 and/or one or more sensors 1140. Retriever 1130 may be mounted on a track with an actuator that can move retriever 1130 to a front or back of platform 1110. Retriever 1130 may include any of the aforementioned actuators and methods of object retrieval. For instance, retriever 1130 may include an actuator that generates a vacuum force or suction to engage objects. Retriever 1130 may additionally or alternatively include an articulating arm with an opening and closing claw, a telescoping retriever, a grabber, magnets, and/or other retrieval elements.

Figure 12:
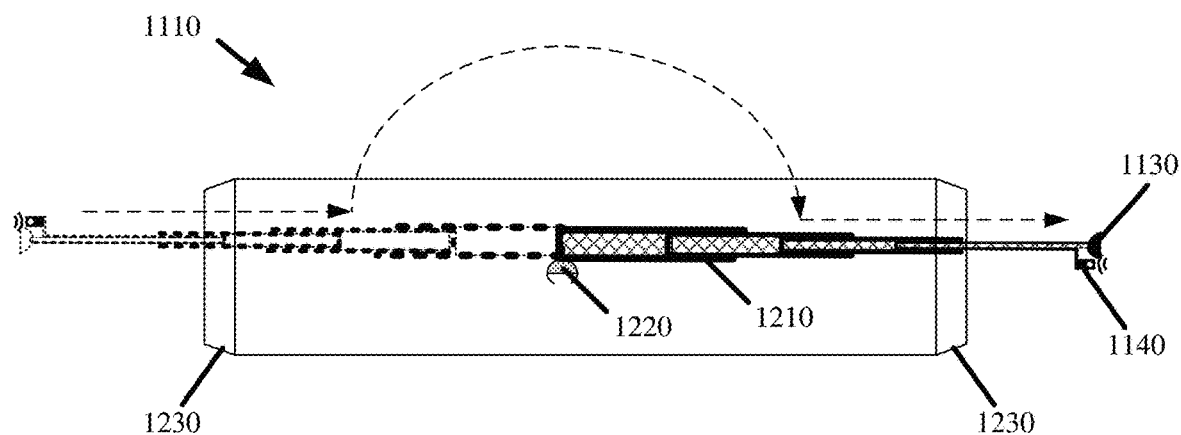
FIG. 12 provides a top view of the side platform for the modified FTH robot in accordance with some embodiments described herein.

FIG. 12 provides a top view of side platform 1110 for FTH robot 1100 in accordance with some embodiments described herein. FIG. 12 illustrates retriever 1130 being positioned about a distal end of telescoping arm 1210. As further shown in FIG. 12, telescoping arm 1210 may extend out over either the front or back of side platform 1110 by flipping or rotating about base 1220. In some embodiments, base 1220 include an actuator that flips or rotates telescoping arm 1210. Telescoping arm 1210 may include an actuator to extend and/or collapse telescoping arm 1210 as well as power retriever 1130 at the distal end. In this manner, retriever 1130 may be used to retrieve objects that are positioned about either the front or back of FTH robot 1100. Such functionality may reduce the number of movements that are needed to position FTH robot 1100 relative to an object. Moreover, the ability to flip retriever 1130 may allow FTH robot 1100 to retrieve a first object that is in front of FTH robot 1100 onto side platform 1110-1, then flip over and retrieve a second object that is behind FTH robot 1100 onto side platform 1110-1, effectively doubling the number of objects that can be retrieved to each side platform 1110.

FIG. 12 further illustrates each side platform 1110 with ramp 1230 on either side. Once again, ramp 1230 may assist in the retrieval of objects off the ground or floor by providing a transition from the ground or floor to the platform 1110.

Sensor 1140 may be positioned on or near retriever 1130 in order to guide retriever 1130 to an on-center retrieval of an object. Sensor 1140 may also detect when the object has been engage by retriever 1130. Each side platform 1110 may also include load sensors that can measure the weight of a retrieved object that is placed onto side platform 1110.

With vertical extensions 1120 moved to the sides of FTH robot 1100, sensors 1150 may be positioned the front of FTH robot 1100 for navigation and/or object alignment purposes. For instance, sensor 1150 on motorized base 110 may be used to guide FTH robot 1100 in a site and avoid obstacles therein when in motion. Sensors 1150 on upper platform 130 may be used to guide lift 120. For instance, sensors 1150 may determine when upper platform 130 has reached the height of an object, and other sensors about side platform 1110 or retriever 1130 may be used to align the bottom of side platform 1110 with a bottom of the desired object.

FTH robot 1100 may also include one or more wireless radios 1160 for wirelessly communicating with other robots or a robot management system. Wireless radios 1160 may be used to obtain new tasks for FTH robot 1100 to perform, and/or to signal when tasks have been completed (e.g., an object has been retrieved and/or delivered to a destination).

Although not shown in FIG. 11, motorized base 110 and/or upper platform 130 of FTH robot 1100 may include stationary or moveable counter-weights. The counter-weights can ensure that FTH robot 1100 does not become unbalanced when supporting one or more retrieved objects on one or more of side platforms 1110. In some embodiments, the counter-weights of FTH robot 1100 may move across a length of either motorized base 110 and/or upper platform 130 in order to restore balance when one or more objects are stored at a front or back of side platforms 1110 such that there is uneven weight about the front or back of FTH robot 1100. In some embodiments, the counter-weights of FTH robot 1100 may move across a width of either motorized base 110 and/or upper platform 130 in order to restore balance when one or more object are stored on just one of side platforms 1110 such that there is uneven weight about the sides of FTH robot 1100.

FTH robot 1100 may optionally include top-mounted retriever 1170. Retriever 1170 may be disposed atop upper platform 130. Retriever 1170 may be used to retrieve an object onto upper platform 130. In some embodiments, retriever 1170 may be connected to a motor that moves retriever 1170 between front and back ends of upper platform 130. Retriever 1170 may extend out over one side of FTH robot 1100 (e.g., front or back side) in order to engage an object in front or behind FTH robot 1100 at the height of upper platform 130. Moreover, retriever 1170 may be used to retrieve objects at heights that cannot be accessed by retrievers 1130 by virtue of the positioning of retriever 1170 atop upper platform 130. For instance, lift 120 may raise upper platform 130 to a maximum height, and retriever 1170 may engage an object at that height, whereas retrievers 1130 are positioned lower on side platforms 1110. In some embodiments, retriever 1170 may be a vacuum, articulating arm, telescoping arm, and/or other engaging element with which to engage an object and pull the object from a storage location onto upper platform 130.

The three retrievers (e.g., retrievers 1130 on side platform 1110-1, 1130 on side platform 1110-2, and retriever 1170 on upper platform 130) and three platforms (e.g., side platform 1110-1, side platform 1110-2, and upper platform 130) maximize surface area usage and utility of FTH robot 1100 by allowing FTH robot 1100 to transfer three or more objects at any given time. Consequently, FTH robot 1100 may make fewer trips between object storage locations and an order fulfillment station.

Figure 13A:
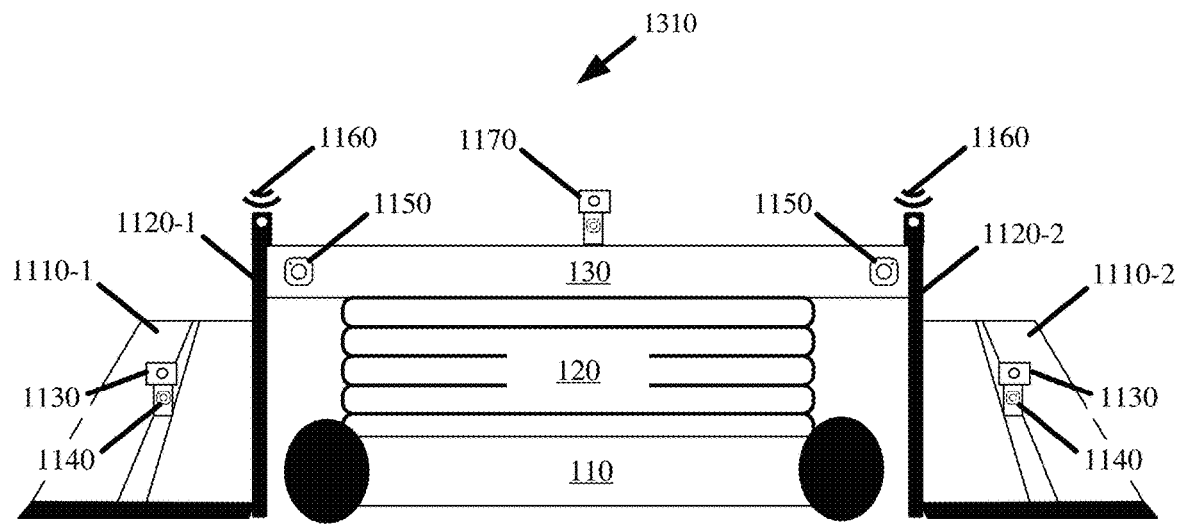
FIGS. 13A and 13B illustrates alternative embodiments of the FTH robot in accordance with some embodiments described herein.
Figure 13B:
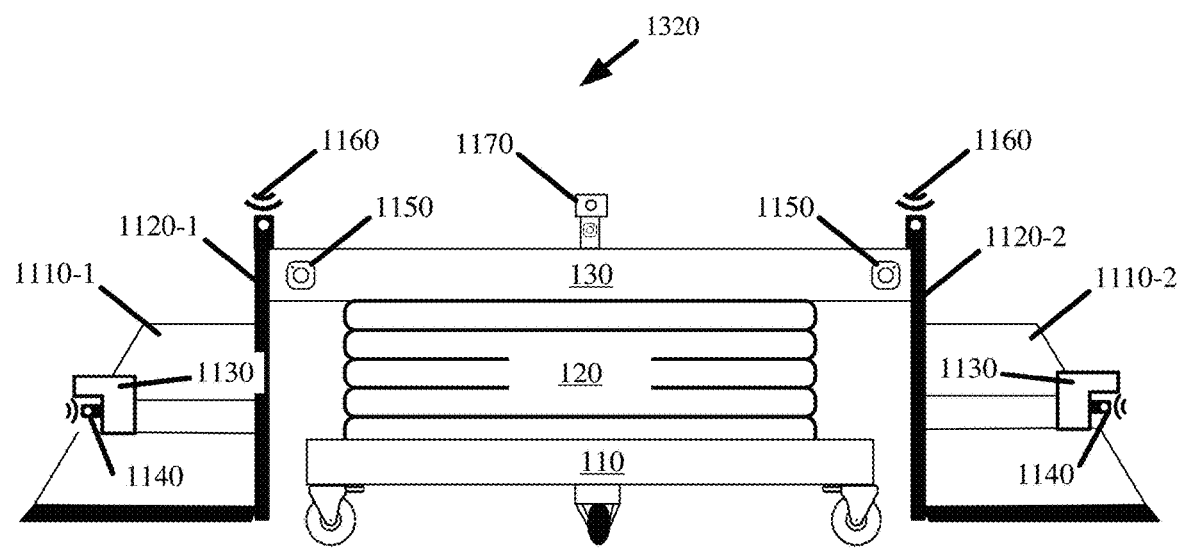

FIGS. 13A and 13B illustrates alternative embodiments of the FTH robot in accordance with some embodiments described herein. In particular, FIG. 13A illustrates FTH 1310 that is similar to FTH robot 1100 but with an alternate motorized base 110. In FIG. 13A, the wheels of base 110 are positioned to be perpendicular to side platforms 1110. The manner with which the FTH robot retrieves objects may be modified in order to accommodate the wheel positioning and/or wheel rotation. In some embodiments, the wheels may rotate 360 degrees. FIG. 13B illustrates FTH robot 1320, that is similar to FTH robot 1100 but with retrievers 1130 turned 90 degrees for front and rear retrieval of objects. For instance, FTH robot 1320 may drive forward into a first stack of objects to retrieve a first object with retriever 1130 on platform 1110-2, and may reverse into a second stack of objects to retrieve a second object with retriever 1130 on platform 1110-1. In some embodiments, retrievers 1130 may be able to rotate in 360 degrees to allow for retrieval of objects that have different orientations relative to FTH robot 1320.

Figure 14:
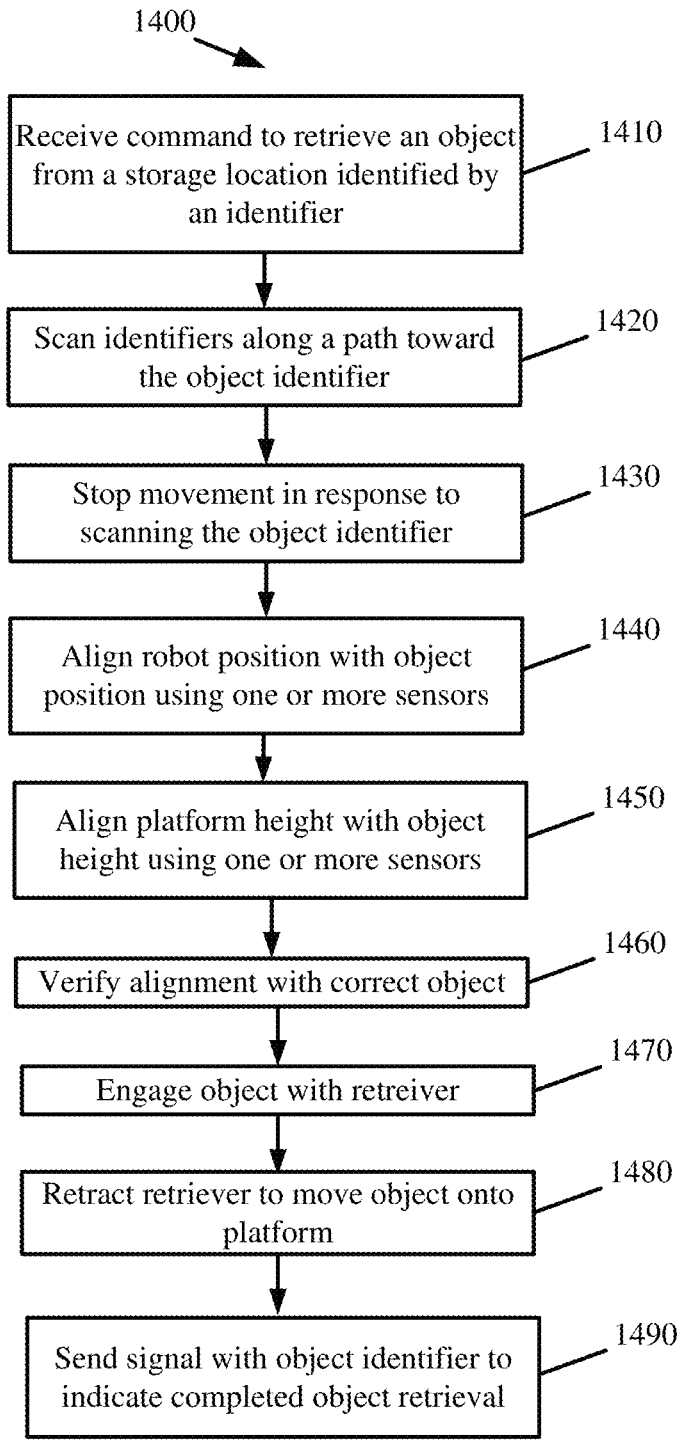
FIG. 14 presents a process for autonomous object retrieval using one or more of the FTH robots in accordance with some embodiments presented herein.

FIG. 14 presents process 1400 for autonomous object retrieval using one or more FTH robots 100 in accordance with some embodiments presented herein. Process 1400 may be performed using the processors, actuators, and/or other structures of FTH robot 100.

Process 1400 may include receiving (at 1410) a command to retrieve an object from a storage location. The command may include one or more of a first identifier for identifying the object, and a second identifier for identifying the storage location. The identifiers may be found on or near the object and storage location. For instance, the identifiers may be fiducials that are attached to the object and/or storage location. The command may also include a path by which FTH robot 100 can arrive at the storage location. The command may also include information about the object and/or the storage location. For instance, information about the object may include size, shape, weight, and/or features by which FTH robot 100 can identify the object using its sensors. Information about the storage location may include where the object is stored at the storage location (e.g., a particular height), expected quantity of objects at the storage location, and/or other data that may assist FTH robot 100 in identifying and/or retrieving a particular object from the storage location. FTH robot 100 may wirelessly receive (at 1410) the command from a robot management system. The robot management system may remotely control the operations that are performed by a set of robots, including FTH robot 100, in a common site.

Process 1400 may include scanning (at 1420) identifiers along a path toward the storage location. For instance, each pathway in a site may be marked with different identifiers that FTH robot 100 may use to verify that it is headed in the right direction or is moving along the correct path. In some embodiments, stationary beacons may broadcast identifiers that FTH robot 100 can receive and determine its position within a site.

Process 1400 may include stopping (at 1430) movement of motorized base 110 in response to FTH robot 100 scanning the identifier that corresponds to the storage location of the object or the identifier of the object. In response to identifying the storage location, process 1400 may include aligning (at 1440) positioning of FTH robot 100 with the storage location and/or object position using one or more sensors of FTH robot 100. In particular, FTH robot 100 repositions, via movements of motorized base 110, lower platform 150 to be centered against the storage location of the object to avoid an off-center retrieval of the object. More specifically, FTH robot 100 repositions lower platform 150 to be parallel to the storage location or object edge, with the center of the storage location and/or object being aligned with a center of lower platform 150. The repositioning can be conditioned on sensory information that FTH robot 100 collects using its onboard sensors. For instance, FTH robot 100 may perform image processing of images captured via one or more cameras to determine the center of the storage location and/or object. Similarly, scannable identifiers may be positioned at the center of each storage location or object to assist FTH robot 100 in its positioning.

Process 1400 may also including aligning (at 1450) the vertical position of lower platform 150 with the vertical position of the object. Aligning the vertical position of lower platform 150 may include raising lift 120 until lower platform 150 is aligned with the bottom of the object that is stored at some height off the ground. Alternatively, FTH robot 100 may lower lift 120 to allow for retrieval of an object that is located on the ground.

At this stage, one or more sensors of FTH robot 100 may scan or image the object before lower platform 150 to verify (at 1460) that the correct object is to be retrieved. In particular, an identifier associated with the object and/or features of the object may be imaged using one or more sensors of FTH robot 100. The identifier and/or features may be compared against object identifying information that is received (at 1410) as part of the object retrieval command. If the information matches, then FTH robot 100 has verified (at 1460) that it is aligned with the desired object, and may proceed with the object retrieval.

Accordingly, process 1400 may include engaging (at 1470) the object using the retriever (e.g., retriever 160 or retriever 710) of FTH robot 100. One or more sensors on the retriever or elsewhere on FTH robot 100 may detect when contact is made and/or the object is engaged. For instance, FTH robot 100 may extend retriever 160 or retriever 710 until pressure is detected to indicate that contact is made with a desired object. An actuator (e.g., vacuum, electromagnet, gripper, etc.) at the distal end of the retriever may then be activated to engage the object with suction.

Once the object is engaged, process 1400 may include retracting (at 1480) the robot's retriever to move the engaged object onto lower platform 150. The earlier repositioning and alignment ensures that lower platform 150 supports the object about centrally so as to distribute the object weight evenly across lower platform 150 and to further ensure that the object does fall off one side of lower platform 150 when FTH robot 100 is stationary or transitory.

Process 1400 may include sending (at 1490) a signal to the robot management system, an inventory management system, and/or other remote device to indicate that the object has been removed from the storage location. The signaling may be used to update site inventory. In response to the signaling and/or in furtherance of the earlier received (at 1410) command, FTH robot 100 may transfer the retrieved object to a destination, and place the object at the destination. The destination may include an order fulfillment location, an updated storage location for the object in the site, a storage location where other units of the same object are stored.

Figure 15:
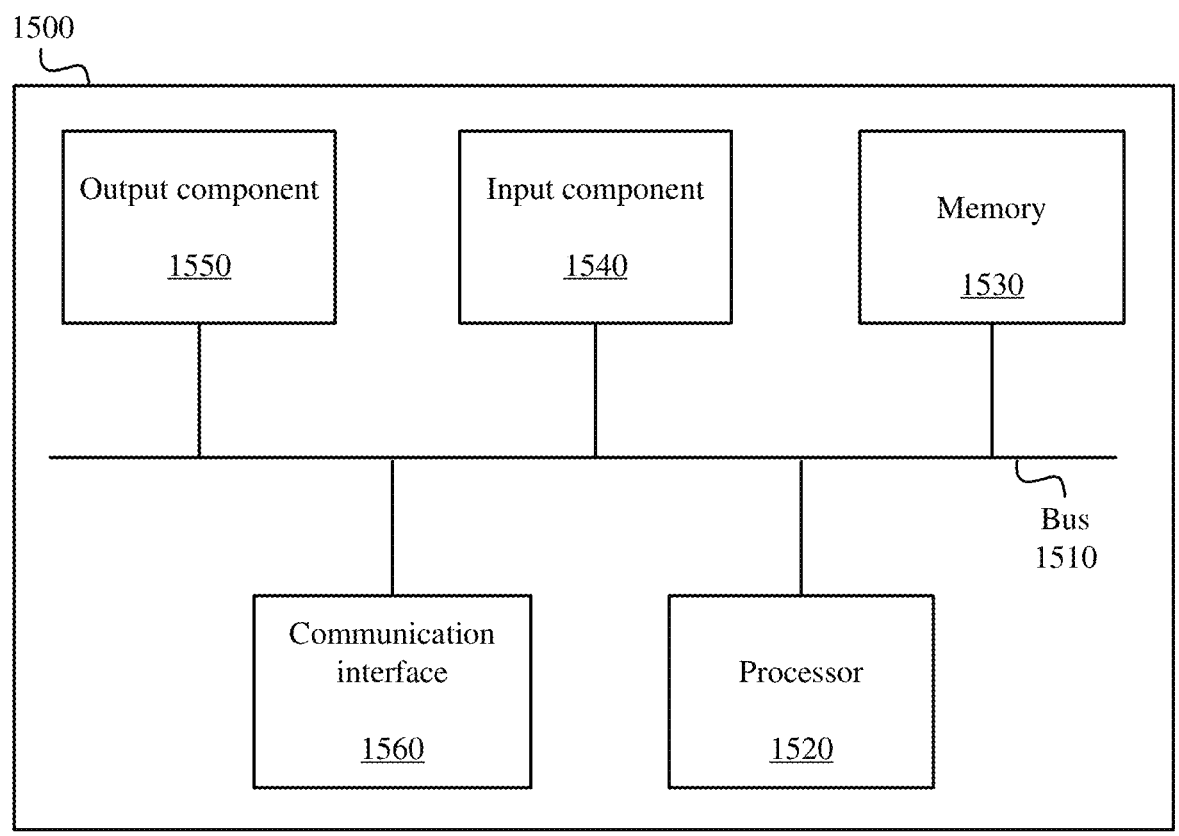
FIG. 15 illustrates example components of one or more devices, according to one or more embodiments described herein.

FIG. 15 is a diagram of example components of device 1500. Device 1500 may be used to implement FTH robot 100 or certain of the FTH robot components. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A robot comprising:
a motorized base;
a lift raising to a plurality of heights from the base;
an upper platform attached atop the lift, the upper platform comprising a tilt sensor and a set of movable counter-weights that move from at least a center of the upper platform to a first side of the upper platform in response to the tilt sensor detecting the robot becoming off-balanced due to a center of gravity of the robot changing, and wherein the set of movable counter-weights move from the center until the tilt sensor detects that balance and the center of gravity of the robot are restored;
a vertical extension extending downwards from a second side of the upper platform this is opposite to the first side;
a lower platform with a proximal end coupled to the vertical extension and a distal end extending laterally from the second side of the robot and directly over a ground surface on which the motorized base moves when the lift is in a lowered position;
a retriever for retrieving an object onto the lower platform;
a second sensor that is located on the lower platform, the second sensor providing sensory input that is used to align the lower platform with a bottom of the object; and
a third sensor that is located on the upper platform, the third sensor providing sensory input that detects a topmost object in a stack prior to the lower platform raising over the topmost object.

2. The robot of claim 1, wherein the second sensor detects when the retriever has engaged the object.

3. The robot of claim 2, wherein the retriever is positioned on the lower platform, and wherein the second sensor is positioned on the retriever.

4. The robot of claim 1, wherein the retriever is located on the lower platform, and wherein the lower platform comprises a drive motor moving the retriever between the proximal end and the distal end of the lower platform.

5. The robot of claim 1, wherein the retriever comprises one or more of a vacuum or suction cup that engages the object using suction.

6. The robot of claim 1, further comprising an actuator moving one or more of the set of counter-weights towards the first side of the upper platform in response to retrieval of the object onto the lower platform and the tilt sensor detecting a shift in the center of gravity for the robot as a result of the retrieval.

7. The robot of claim 1, wherein the distal end of the lower platform comprises a ramp with which an object can be pulled onto the lower platform from the ground surface.

8. The robot of claim 1 further comprising an actuator about the intersection of the vertical extension and the lower platform, the actuator lifting the distal end of the lower platform from a horizontal position to a vertical position when the lower platform is not in use, and lowering the distal end of the lower platform from the vertical position to the horizontal position that is perpendicular to the vertical extension when the lower platform is in use.

9. The robot of claim 1,
wherein the vertical extension is a first vertical extension;
wherein the lower platform is a first lower platform;
wherein the retriever is a first retriever that extends across the first lower platform in order to retrieve a first object onto the first lower platform;
the robot further comprising:
a second vertical extension extending downwards from the first side of the upper platform and opposite to the first vertical extension extending downwards from the second side of the upper platform;
a second platform with a proximal end coupled to the second vertical extension and a distal end extending laterally from the first side of the robot and directly over the ground surface on which the motorized base moves when the lift is in the lowered position; and a second retriever extending across the second lower platform in order to retrieve a second object onto the second lower platform.

10. A robot comprising:
a motorized base;
a lift raising to a plurality of heights from the base;
a platform coupled to the lift and extending in front of the lift directly over a ground surface on which the motorized base moves when the lift is in a lowered position;
a rotating actuator coupled to one end of the platform;
a retriever;
one or more sensors;
a non-transitory computer-readable medium storing a set of processor-executable instructions; and
one or more processors configured to execute the set of processor-executable instructions, wherein executing the set of processor-executable instructions causes the one or more processors to:
rotate the platform from a horizontal position to a vertical position using the rotating actuator;
operate the motorized base in moving the robot to a storage location with the platform in the vertical position;
rotate the platform from the vertical position to the horizontal position in response to the robot arriving before the storage location;
align a center of the platform with a center of the storage location via movement of the motorized base in response to detecting an identifier for the storage location using the one or more sensors;
raise the lift to align a vertical height of the platform with a bottom of an object at the storage location;
extend the retriever until contact with the object is detected via the one or more sensors; and
retrieve the object by engaging the object with the retriever and retracting the retriever with the object towards a proximal end of the platform.

11. The robot of claim 10, wherein the processor-executable instructions further include processor-executable instructions to:
detect the storage location of the object to be on the ground surface;
lower the lift to the lowered position;
extend the retriever until contact with the object is detected via the one or more sensors;
retrieve the object by engaging the object with the retriever and retracting the retriever with the object towards a proximal end of the platform.

12. The robot of claim 10, wherein the processor-executable instructions further include processor-executable instructions to:
halt movement of the motorized base at the storage location in response to detecting the identifier for the storage location using the one or more sensors.

13. The robot of claim 10, wherein the processor-executable instructions to raise the lift further include processor-executable instructions to:
obtain an identifier associated with the object from the one or more sensors; and
provide the identifier associated with the object to a remote device in response to completing the retrieval of the object.

14. The robot of claim 10, wherein the processor-executable instructions further include processor-executable instructions to:
receive instruction to retrieve the object from the storage location, wherein the instruction comprises a first identifier identifying the object and a second identifier identifying the storage location;
halt movement of the motorized base at the storage location in response to detecting the second identifier using the one or more sensors.

15. The robot of claim 10, wherein the platform comprises:
an upper platform attached to the lift;
a vertical extension extending downward from a frontside of the upper platform in front of the lift;
a lower platform with a proximal end coupled to the vertical extension and a distal end extending in front of the robot; and
the rotating actuator at an intersection between the proximal end of the lower platform and the vertical extension.

16. The robot of claim 10, wherein the processor-executable instructions further include processor-executable instructions to:
activate an engagement element at a distal end of the retriever, wherein activating the engagement element generates a force by which the engagement element engages the object upon contacting the object.

17. A robot comprising:
a motorized base;
a lift raising to a plurality of heights from the base;
an upper platform attached atop the lift, the upper platform comprising a tilt sensor and a set of movable counter-weights that move from at least a center of the upper platform to a first side of the upper platform in response to the tilt sensor detecting the robot becoming off-balanced due to a center of gravity of the robot changing, and wherein the set of movable counter-weights move from the center until the tilt sensor detects that balance and the center of gravity of the robot are restored;
a vertical extension extending downwards from a second side of the upper platform this is opposite to the first side;
a lower platform with a proximal end coupled to the vertical extension and a distal end extending laterally from the second side of the robot and directly over a ground surface on which the motorized base moves when the lift is in a lowered position;
a retriever for retrieving an object onto the lower platform, wherein the retriever comprises a first telescoping arm at a right side of the robot, and a second telescoping arm at a left side, each of the first telescoping arm and the second telescoping arm comprising an engaging element at a distal end, and each of the first telescoping arm and the second telescoping arm collapsing towards a proximal end of the lower platform and extending to a distal end of the lower platform.

18. The robot of claim 17, wherein the first telescoping arm is located on a first rail about a right side of the vertical extension, and the second telescoping arm is located on a second rail about a left side of the vertical extension, and wherein the first rail and the second rail provide vertical displacement of the first telescoping arm and the second telescoping arm respectively about different sides of the vertical extension.

* * * * *